United States Patent
Kim

(10) Patent No.: US 9,300,127 B2
(45) Date of Patent: Mar. 29, 2016

(54) INTERFACE UNIT HAVING OVERCURRENT AND OVERVOLTAGE PROTECTION DEVICE

(71) Applicant: Samsung Electronics Co., Ltd, Suwon-si, Gyeonggi-do (KR)

(72) Inventor: Jin Ha Kim, Hwaseong-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 133 days.

(21) Appl. No.: 13/916,698

(22) Filed: Jun. 13, 2013

(65) Prior Publication Data

US 2013/0335865 A1 Dec. 19, 2013

(30) Foreign Application Priority Data

Jun. 19, 2012 (KR) .................. 10-2012-0065339

(51) Int. Cl.
| | |
|---|---|
| H02H 3/16 | (2006.01) |
| H02H 9/02 | (2006.01) |
| H02H 9/04 | (2006.01) |
| H02H 3/08 | (2006.01) |

(52) U.S. Cl.
CPC . *H02H 3/16* (2013.01); *H02H 3/08* (2013.01); *H02H 9/026* (2013.01); *H02H 9/041* (2013.01)

(58) Field of Classification Search
CPC ........... H02H 3/16; H02H 3/08; H02H 9/041; H02H 9/026
USPC ......................................................... 361/42
See application file for complete search history.

(56) References Cited

U.S. PATENT DOCUMENTS

| | | | |
|---|---|---|---|
| 5,513,060 A | 4/1996 | Bremond | |
| 7,274,543 B2 * | 9/2007 | Nishikawa et al. | ............. 361/56 |
| 8,026,924 B2 * | 9/2011 | Kim | .............................. 345/581 |
| 2005/0186833 A1 * | 8/2005 | Komatsu et al. | .............. 439/405 |
| 2007/0049120 A1 * | 3/2007 | Hemmah | ................. 439/620.01 |

FOREIGN PATENT DOCUMENTS

| | | |
|---|---|---|
| DE | 10232941 | 2/2004 |
| DE | 202005010430 | 9/2005 |
| JP | 2006171860 A * | 6/2006 |

OTHER PUBLICATIONS

English Translation of JP2006171860A.*
European Search Report dated Oct. 7, 2013 issued in EP Application No. 13171789.4.
European Decision on Grant dated Apr. 2, 2015 from European Patent Application No. 13171789.4, 39 pages.

* cited by examiner

*Primary Examiner* — Scott Bauer
(74) *Attorney, Agent, or Firm* — Staas & Halsey LLP

(57) ABSTRACT

An interface unit that interrupts overcurrent or overvoltage resulting from a ground voltage difference between electronic products interconnected through interface devices, so as to prevent damage to the products and risk of fire. The interface unit, which connects a first electronic product and a second electronic product to each other, includes a first interface device provided in the first electronic product and connected with the second electronic product, a second interface device provided in the second electronic product and connected with the first interface device through a VCC line and a ground line, and a ground overcurrent interrupter installed on the ground line, the ground overcurrent interrupter interrupting overcurrent flowing in the ground line.

28 Claims, 14 Drawing Sheets

INTERFACE UNIT HAVING OVERCURRENT AND OVERVOLTAGE PROTECTION DEVICE

CROSS-REFERENCE TO RELATED APPLICATIONS

This application claims priority under 35 U.S.C. §119(a) from Korean Patent Application No. 10-2012-0065339, filed on Jun. 19, 2012 in the Korean Intellectual Property Office, the disclosure of which is incorporated herein by reference in its entirety.

BACKGROUND OF THE INVENTION

1. Field of the Invention

The present general inventive concept relates to an interface unit to connect different electronic products to each other, which prevents overcurrent and overvoltage resulting from a ground voltage difference between the electronic products.

2. Description of the Related Art

Conventional interface devices, such as a universal serial bus (USB) and a high-definition multimedia interface (HDMI), are used to establish a connection between electronic products. Interface devices provided in respective electronic products are interconnected through a VCC line that supplies an operating voltage, a data line that transmits and receives data, and a ground line to establish a ground connection.

Overcurrent may be generated due to various causes such as an error in wiring of the interface devices, and a connection error or short of the data line or VCC line. Such an overcurrent may damage the interface devices and the electronic products and cause risk of fire. In this regard, an overcurrent prevention device is conventionally installed on the VCC line to interrupt overcurrent.

However, even if the overcurrent prevention device is installed on the VCC line, an overcurrent generated in the ground line may not be interrupted. That is, a voltage difference may be generated in the ground line due to various causes such as use of different power sources in the electronic products, for example, two electronic products, interconnected through the interface devices, and exposure of an outdoor antenna of the electronic products to a surge. Such a ground voltage difference may generate overcurrent, which may generate heat in a connector between the two electronic products, damage the devices and cause risk of fire.

Therefore, a unit should be designed to prevent overcurrent or overvoltage resulting from a ground voltage difference.

SUMMARY OF THE INVENTION

The present invention provides an interface unit to interrupt overcurrent or overvoltage resulting from a ground voltage difference between electronic products interconnected through interface devices, so as to prevent damage to the electronic products and risk of fire.

Additional features and utilities of the present general inventive concept will be set forth in part in the description which follows and, in part, will be obvious from the description, or may be learned by practice of the general inventive concept.

The foregoing and/or other features and utilities of the present general inventive concept are achieved by providing an interface unit, which connects a first electronic product and a second electronic product to each other, includes a first interface device provided in the first electronic product and connected to the second electronic product, a second interface device provided in the second electronic product and connected with the first interface device through a VCC line and a ground line, and a ground overcurrent interrupter installed on the ground line, the ground overcurrent interrupter interrupting overcurrent flowing in the ground line.

The interface unit may further include an overvoltage protector installed on the VCC line, the overvoltage protector keeping a voltage applied to the VCC line at a predetermined reference level or less.

The overvoltage protector may include a voltage clamping device to clamp a voltage of a predetermined level.

The voltage clamping device may include a Zener diode, the Zener diode having a cathode connected to the VCC line and an anode connected to the ground line.

The interface unit may further include a VCC overcurrent interrupter installed on the VCC line, the VCC overcurrent interrupter interrupting overcurrent flowing in the VCC line.

The interface unit may further include an active switch installed on the VCC line, the active switch breaking a connection between operating voltage sources through the VCC line when a voltage of more than a predetermined level is input thereto.

The active switch may have a voltage input terminal connected to an output terminal of the overvoltage protector.

The interface unit may further include a resistor connected to the output terminal of the overvoltage protector, the resistor having a certain resistance.

The active switch may interrupt current flowing in the VCC line when the voltage of more than the predetermined level is input thereto through the voltage input terminal thereof.

The active switch may include at least one of a bipolar transistor and a field effect transistor (FET).

The interface unit may further include a VCC overcurrent interrupter installed on the VCC line, the VCC overcurrent interrupter interrupting overcurrent flowing in the VCC line.

Each of the ground overcurrent interrupter and VCC overcurrent interrupter may include at least one of a fuse and a polyswitch.

The overvoltage protector may include a voltage clamping device to clamp a voltage of a predetermined level.

The voltage clamping device may include a Zener diode, the Zener diode having a cathode connected to the VCC line and an anode connected to the ground line.

The foregoing and/or other features and utilities of the present general inventive concept may also be achieved by providing an interface unit, which connects a first electronic product and a second electronic product with different power sources to each other, includes a first interface device provided in the first electronic product, a second interface device provided in the second electronic product and connected to the first interface device through a VCC line and a ground line, a ground overcurrent interrupter installed on the ground line, the ground overcurrent interrupter interrupting overcurrent flowing in the ground line, and a VCC overcurrent interrupter installed on the VCC line, the VCC overcurrent interrupter interrupting overcurrent flowing in the VCC line.

The interface unit may further include an overvoltage protector connected between the VCC line and the ground line, the overvoltage protector keeping a voltage applied to the VCC line at a predetermined reference level or less.

The overvoltage protector may include a voltage clamping device to clamp a voltage of a predetermined level.

The voltage clamping device may include a Zener diode, the Zener diode having a cathode connected to the VCC line and an anode connected to the ground line.

The interface unit may further include an active switch installed on the VCC line, the active switch breaking a connection between operating voltage sources through the VCC line when a voltage of more than a predetermined level is input thereto.

The active switch may have a voltage input terminal connected to an output terminal of the overvoltage protector.

The active switch may include at least one of a bipolar transistor and a field effect transistor (FET).

The foregoing and/or other features and utilities of the present general inventive concept may also be achieved by providing an image forming system, which has a host device and an image forming device connected to the host device, includes a first interface device provided in the host device and connected to the image forming device, a second interface device provided in the image forming device and connected with the first interface device through a VCC line and a ground line, and a ground overcurrent interrupter installed on the ground line, the ground overcurrent interrupter interrupting overcurrent flowing in the ground line.

The image forming system may further include an overvoltage protector installed on the VCC line, the overvoltage protector keeping a voltage applied to the VCC line at a predetermined reference level or less.

The overvoltage protector may be connected between the VCC line and the ground line.

The overvoltage protector may include a voltage clamping device to clamp a voltage of a predetermined level.

The voltage clamping device may include a Zener diode, the Zener diode having a cathode connected to the VCC line and an anode connected to the ground line.

The image forming system may further include a VCC overcurrent interrupter installed on the VCC line, the VCC overcurrent interrupter interrupting overcurrent flowing in the VCC line.

The image forming system may further include an active switch installed on the VCC line, the active switch breaking a connection between operating voltage sources through the VCC line when a voltage of more than a predetermined level is input thereto.

The active switch may have a voltage input terminal connected to an output terminal of the overvoltage protector.

The image forming system may further include a resistor connected to the output terminal of the overvoltage protector, the resistor having a certain resistance.

The active switch may interrupt current flowing in the VCC line when the voltage of more than the predetermined level is input thereto through the voltage input terminal thereof.

The active switch may include at least one of a bipolar transistor and a field effect transistor (FET).

The image forming system may further include a VCC overcurrent interrupter installed on the VCC line, the VCC overcurrent interrupter interrupting overcurrent flowing in the VCC line.

Each of the ground overcurrent interrupter and VCC overcurrent interrupter may include at least one of a fuse and a polyswitch.

The foregoing and/or other features and utilities of the present general inventive concept may also be achieved by providing an interface unit, including a ground line to connect a first electronic product to a second electronic product and to a ground, and a ground overcurrent interrupter installed on the ground line to interrupt overcurrent flowing in the ground line.

The interface unit may further include a first interface device provided in the first electronic product, and a second interface device provided in the second electronic product and connected with the first interface device through a VCC line, a data line, and the ground line.

The interface unit may further include an overvoltage protector including one end installed on the VCC line and another end installed on the ground line to keep a voltage applied to the VCC line at a predetermined reference level or less.

The overvoltage protector may be installed between the first interface device and the second interface device.

The interface unit may further include a VCC overcurrent interrupter installed on the VCC line to interrupt overcurrent flowing in the VCC line.

The VCC overcurrent interrupter may be installed between the overvoltage protector and the second interface device.

The interface unit may further include an active switch installed on the VCC line to break a connection between operating voltage sources through the VCC line in response to a voltage of more than a predetermined level being input thereto.

The active switch may be installed between the overvoltage protector and the second interface device.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
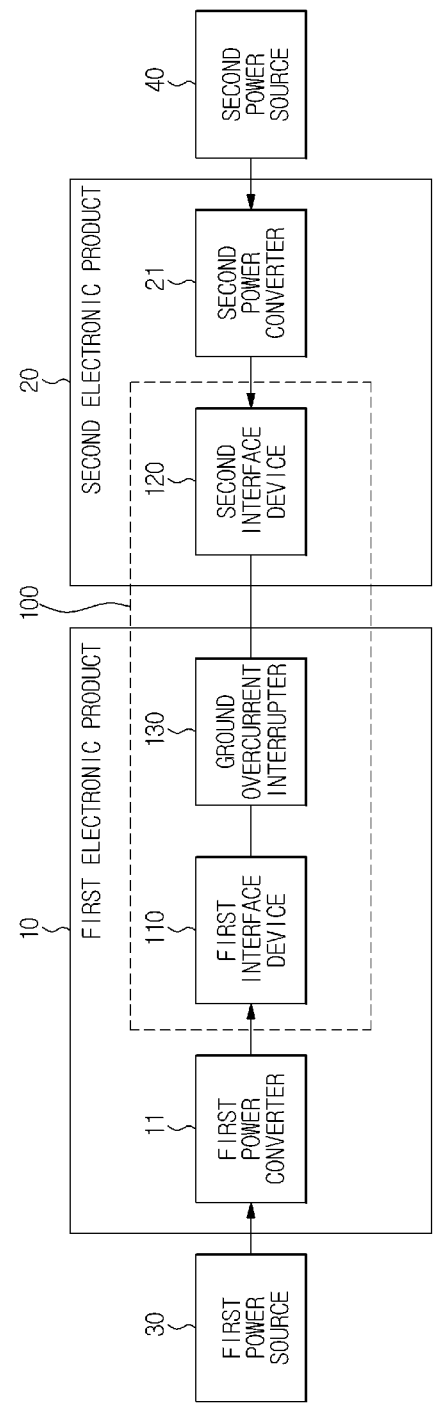
FIG. 1 is a block diagram illustrating a configuration of an interface unit according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

Figure 2:
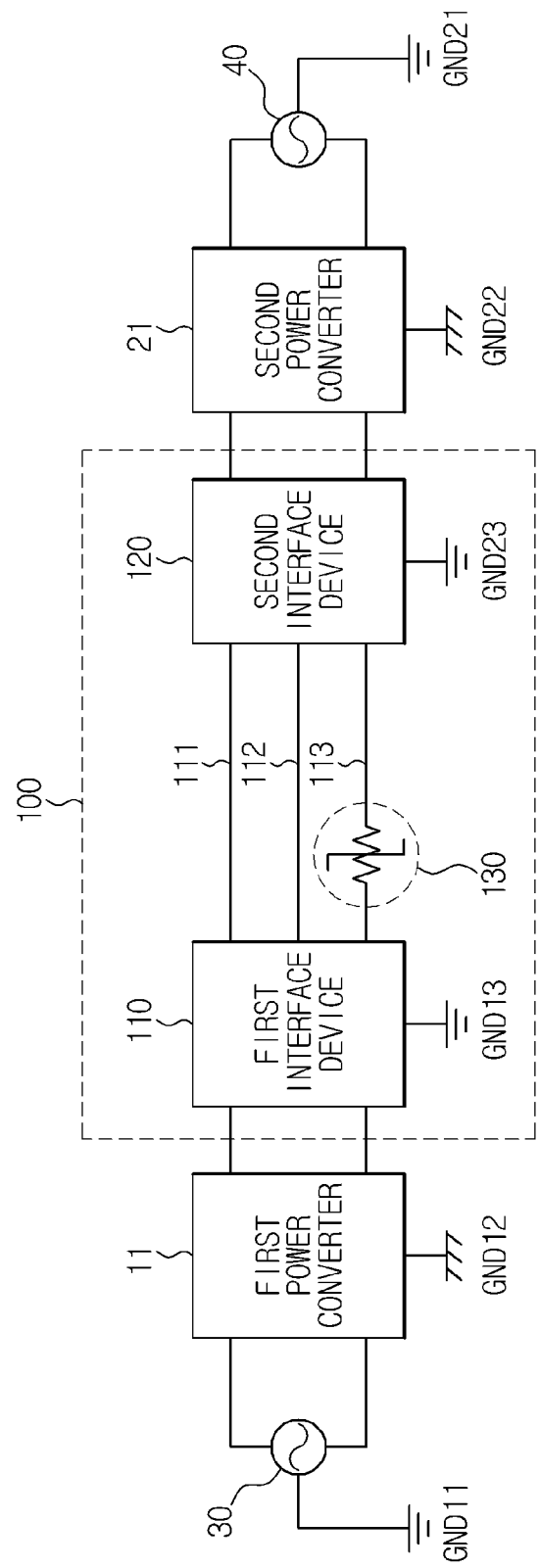
FIG. 2 is a schematic circuit diagram of the interface unit according to an exemplary embodiment of the present general inventive concept.

FIG. 1 is a block diagram illustrating a configuration of an interface unit 100 according to an exemplary embodiment of the present general inventive concept, and FIG. 2 is a schematic circuit diagram of the interface unit 100 according to an exemplary embodiment of the present general inventive concept.

Referring to FIGS. 1 and 2, the interface unit 100 interconnects a first electronic product 10 and a second electronic product 20. As such, the interface unit 100 includes a first interface device 110 provided in the first electronic product 10, a second interface device 120 provided in the second electronic product 20, and a ground overcurrent interrupter 130 installed on a ground line 113, which interconnects grounds of the first interface device 110 and second interface device 120.

Assuming that the first electronic product 10 is a host and the second electronic product 20 is a slave, the first electronic product 10 may be a personal computer (PC), a notebook computer, a tablet computer, etc., but is not limited thereto, and the second electronic product 20 may be a television (TV), a printer, a multifunction printer, an audio device, a video device, etc., but is not limited thereto, which is connected to the first electronic product 10 to exchange data therewith. These electronic products are only examples, and any other electronic product may be the first electronic product 10 or second electronic product 20.

In addition, it should be noted that the first electronic product 10 and the second electronic product 20 are not necessarily classified as a host and a slave, respectively. In other words, the first electronic product 10 may be the slave, while the second electronic product 20 may be the host.\

The first electronic product 10 receives power from a first power source 30. The first power source 30 supplies alternating current (AC) power to the first electronic product 10, and is connected to ground. The ground of the first power source 30 is denoted by GND11.

Grounds may roughly be classified into signal ground (SG), frame ground (FG), and earth. The SG represents a reference point (generally 0V) or feedback path for a signal line when signals are externally input and output, the FG signifies ground based on a case, frame, chassis or the like of a device, and the earth signifies ground to the earth.

Any of the above grounds may be used in the present embodiment, and ground circuit symbols in FIG. 2 are only examples. The ground GND11 of the first power source 30 may be the earth or FG depending on the type of the first power source 30.

When the AC power from the first power source 30 is supplied, a first power converter 11 provided in the first electronic product 10 converts the AC power into direct current (DC) power. The first power converter 11 may be implemented with a switching mode power supply (SMPS), which converts an AC line frequency of 50 Hz to 60 Hz into a high DC frequency of several tens kHz to several hundreds kHz.

Ground is also required in the first electronic product 10 itself. The first electronic product 10 may be grounded through ground of the first power converter 11. An example of the ground of the first power converter 11 is described as follows. A ground line may be provided inside of the first power converter 11 and may be connected to a portion of a cover of the first power converter 11, which is in turn connected to a portion of a screw hole that fixes the first power converter 11 to a case of the first electronic product 10, thereby allowing the first power converter 11 to be grounded. The ground of the first power converter 11 is denoted by GND12, and is the FG.

The second electronic product 20 has a separate power source different from the power source of the first electronic product 10. That is, the second electronic product 20 receives power from a second power source 40 different from the first power source 30. Similarly, the second power source 40 supplies AC power to the second electronic product 20, and is connected to ground. The ground of the second power source 40 is denoted by GND21. The ground GND21 of the second power source 40 may be the earth or FG depending on a type of the second power source 40.

A second power converter 21, such as an SMPS, is also provided in the second electronic product 20 to convert the AC power supplied from the second power source 40 into DC power. Likewise, the second electronic product 20 may be grounded through ground of the second power converter 21. The ground of the second power converter 21 is denoted by GND22. In the current embodiment of the present general inventive concept, the ground GND22 of the second power converter 21 is the FG, similar as the ground GND12 of the first power converter 11.

The first electronic product 10 and the second electronic product 20 are interconnected through the first interface device 110 and the second interface device 120 provided respectively therein. The first interface device 110 and the second interface device 120 may be implemented by any interface devices appropriate to specifications of the respective electronic products, such as a universal serial bus (USB) and a high-definition multimedia interface (HDMI). In addition, the interface devices 110 and 120 may be of any type so long as they can interconnect the first electronic product 10 and the second electronic product 20.

The first interface device 110 and the second interface device 120 are also connected to grounds. The ground of the first interface device 110 is denoted by GND13, and the ground of the second interface device 120 is denoted by GND23.

The first interface device 110 and the second interface device 120 are interconnected through a VCC line 111 that interconnects operating voltage sources of the first electronic product 10 and the second electronic product 20, a data line 112 that transmits and receives data between the first electronic product 10 and the second electronic product 20, and the ground line 113 to establish a ground connection. As a result, the first electronic product 10 and the second electronic product 20 share a power supply and ground with each other.

In general, it is normal that there is no voltage difference in the ground line 113. However, a voltage difference may be generated in the ground line 113 due to various causes such as use of different power sources in two interconnected electronic products, and exposure of an outdoor antenna of the electronic products to a surge.

Such a ground voltage difference may generate overcurrent of several tens of amperes even if it is no more than several volts. Such overcurrent may generate heat in the interface devices, resulting in risk of fire.

Therefore, the interface unit 100 according to the current embodiment of the present general inventive concept includes the ground overcurrent interrupter 130, which interrupts overcurrent flowing in the ground line 113.

Figure 4:
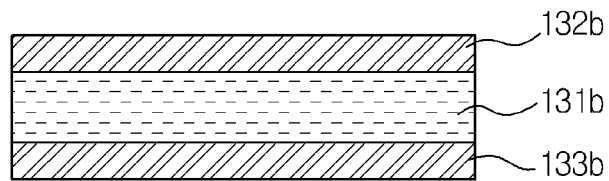
FIG. 4 is a view illustrating a configuration of a polyswitch as another example of the ground overcurrent interrupter.

The ground overcurrent interrupter 130 may be implemented with a variety of fuses or polyswitches, which may be of any type so long as they can interrupt overcurrent flowing in a circuit. In FIG. 2, and FIG. 4 to be described later, a polyswitch is illustrated as an example of the ground overcurrent interrupter 130.

Hereinafter, the configuration and operation of the ground overcurrent interrupter 130 will be described in detail.

Figure 3:
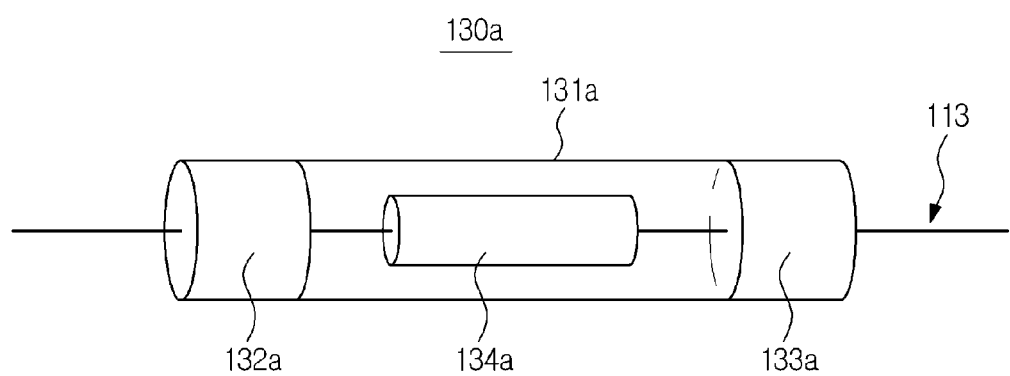
FIG. 3 is a view illustrating a configuration of a fuse as an example of a ground overcurrent interrupter.

FIG. 3 illustrates a configuration of a fuse 130a as an example of the ground overcurrent interrupter 130, and FIG. 4 illustrates configuration of a polyswitch 130b as another example of the ground overcurrent interrupter 130.

The fuse 130a is a type of automatic circuit breaker that is used to prevent overcurrent from flowing in a conductor. When current flowing in the conductor is greater than predetermined breaking current, a current circuit is broken. That is, the fuse 130a is blown due to heat generated by overcurrent, so as to cut the conductor.

Referring to FIG. 3, when the ground overcurrent interrupter 130 according to the current embodiment of the present general inventive concept is implemented with the fuse 130a, the ground line 113 is passed through the fuse 130a via terminals 132a and 133a provided at both side ends of a housing 131a of the fuse 130a. When a current greater than the breaking current flows in the ground line 113 during a predetermined time or longer, a fusible element 134a provided inside of the housing 131a is fused by heat generated within the housing 131a, so as to break the current circuit. As such, when the fuse 130a is blown, thereby breaking the current circuit, the fuse 130a must be replaced to reconnect the current circuit.

The polyswitch 130b, in contrast, uses a positive temperature coefficient (PTC) polymer 131b having a characteristic that electric resistance thereof increases sharply as temperature rises. At room temperature, the PTC polymer 131b has an adequately low resistance, so that current normally flows in a circuit. However, when overcurrent flows in the circuit, Joule heat is generated in the PTC polymer 131b due to such large current, resulting in an increase in temperature of the PTC polymer 131b and, in turn, an increase in resistance of the PTC polymer 131b. As a result, no current flows in the circuit due to the characteristic of the PTC polymer. Thereafter, when current normally flows in the circuit, the PTC polymer 131b again falls in temperature and, in turn, in resistance, so as to guarantee the normal current flow. Therefore, the polyswitch 130b using the PTC polymer may be used continuously and repeatedly.

Referring to FIG. 4, the polyswitch 130b, includes electrodes 132b and 133b attached to both sides of the PTC polymer 131b. The electrodes 132b and 133b are electrically connected to an electric device to interrupt overcurrent flowing in the electric device. When ere the ground overcurrent interrupter 130 according to the current embodiment of the present general inventive concept is implemented with the polyswitch 130b, the electrodes 132b and 133b attached to both sides of the PTC polymer 131b are electrically connected to the ground line 113 to interrupt overcurrent flowing in the ground line 113.

The amount of breaking current that is a reference corresponding to interruption of the flow of current by the ground overcurrent interrupter 130 may be preset in consideration of the types, usages, installation positions, etc. of the interface devices.

Figure 5:
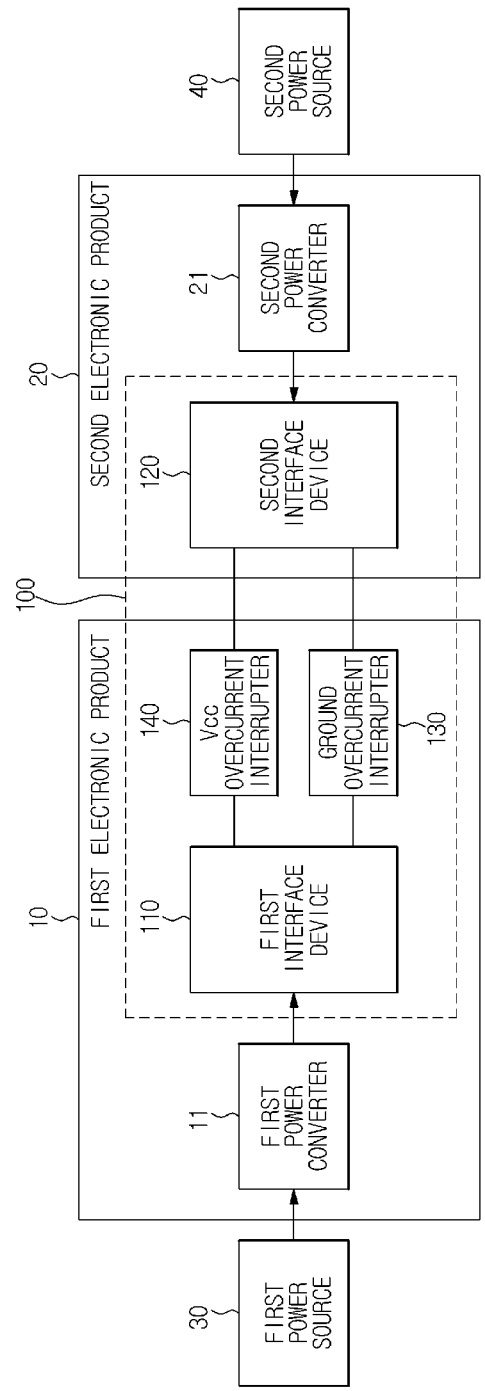
FIG. 5 is a block diagram illustrating a configuration of an interface unit that further includes a VCC overcurrent interrupter installed on a VCC line.
Figure 6:
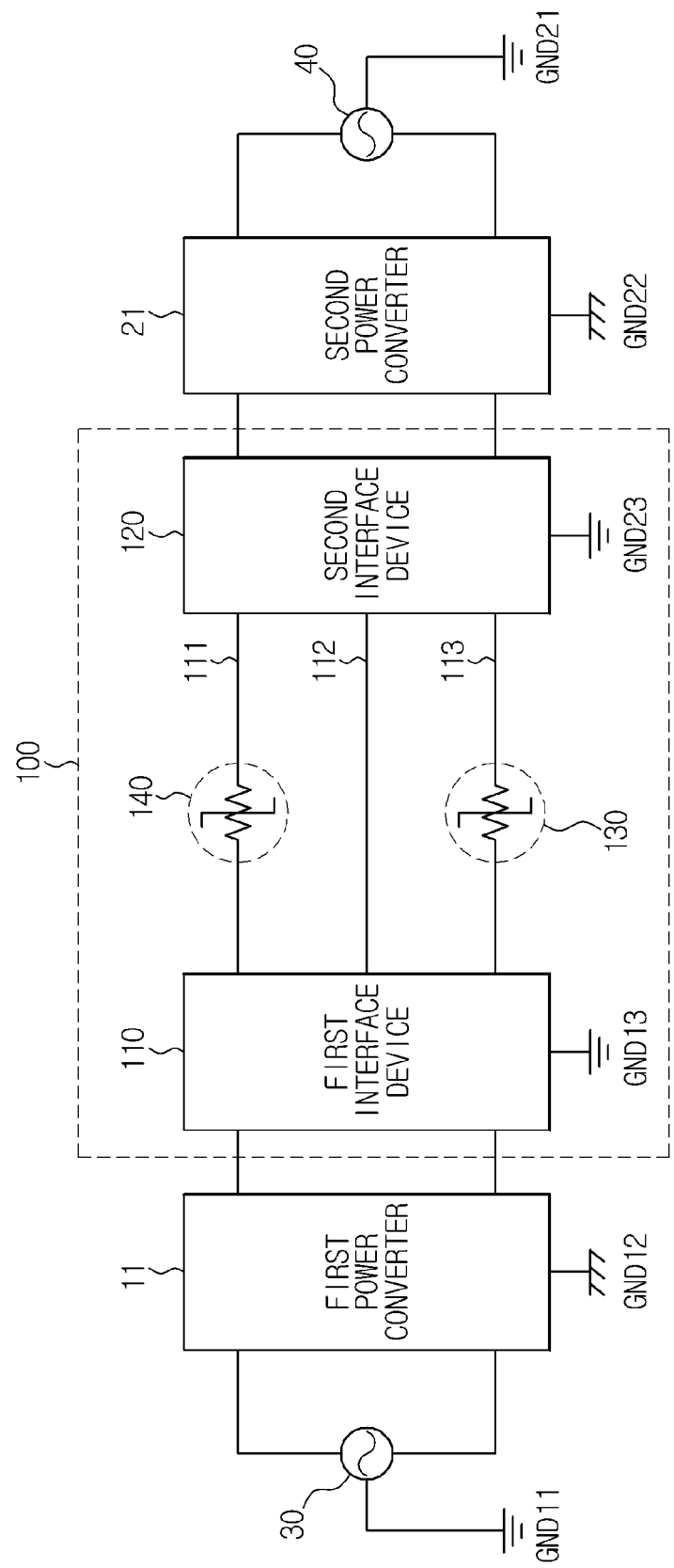
FIG. 6 is a schematic circuit diagram of the interface unit of FIG. 5.

FIG. 5 is a block diagram illustrating a configuration of an interface unit 100 that further includes a VCC overcurrent interrupter 140 installed on a VCC line 111, and FIG. 6 is a schematic circuit diagram of the interface unit 100 of FIG. 5.

Referring to FIGS. 5 and 6, the interface unit according to the an exemplary embodiment of the present general inventive concept may further include the VCC overcurrent interrupter 140 installed on the VCC line 111, as well as the ground overcurrent interrupter 130 installed on the ground line 113.

When a short occurs in the first or second electronic products 10 and 20, respectively, overcurrent may also be generated in the VCC line 111. The overcurrent generated in the VCC line 111 may also generate heat in the products, resulting in damage to the products and risk of fire. In this regard, in the interface unit according to the one embodiment of the present invention, the VCC overcurrent interrupter 140 may be installed on the VCC line 111.

The configuration of the interface unit other than the VCC overcurrent interrupter 140 is the same as that stated previously with reference to FIGS. 1 and 2. The VCC overcurrent interrupter 140 functions to interrupt overcurrent that is generated in the VCC line 111 due to the event of a short, or the like, and may be implemented with an overcurrent interrupting element such as a fuse or polyswitch, in a similar manner to the ground overcurrent interrupter 130.

Figure 7:
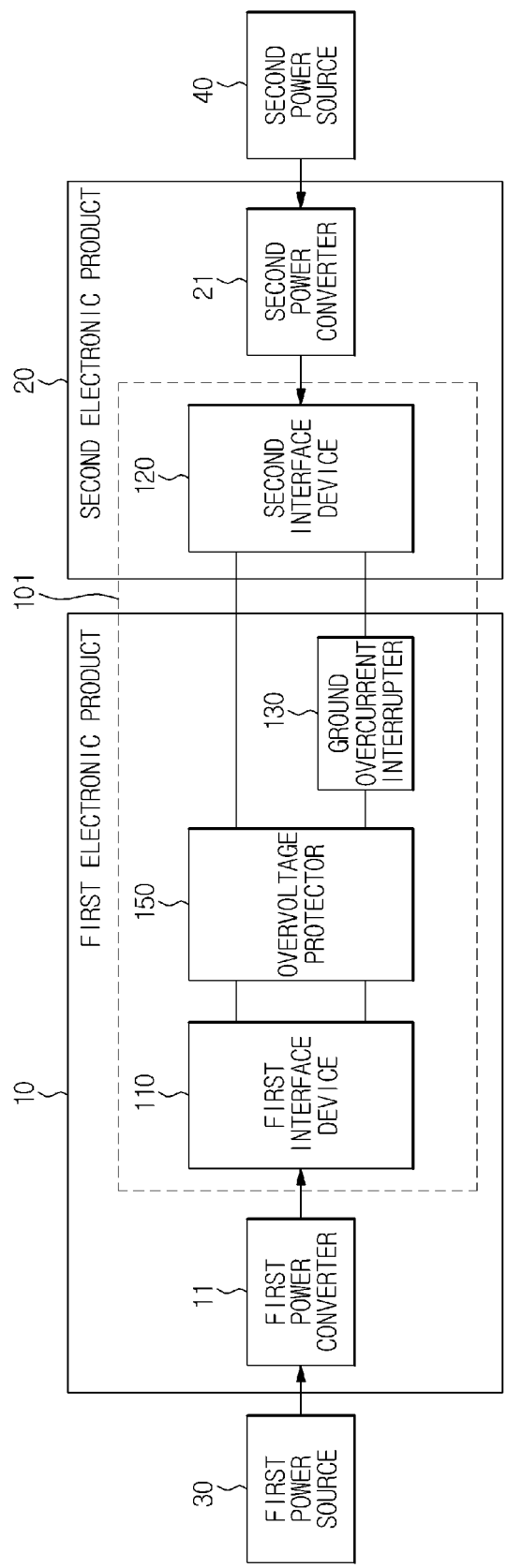
FIG. 7 is a block diagram illustrating a configuration of an interface unit according to another exemplary embodiment of the present general inventive concept.
Figure 8:
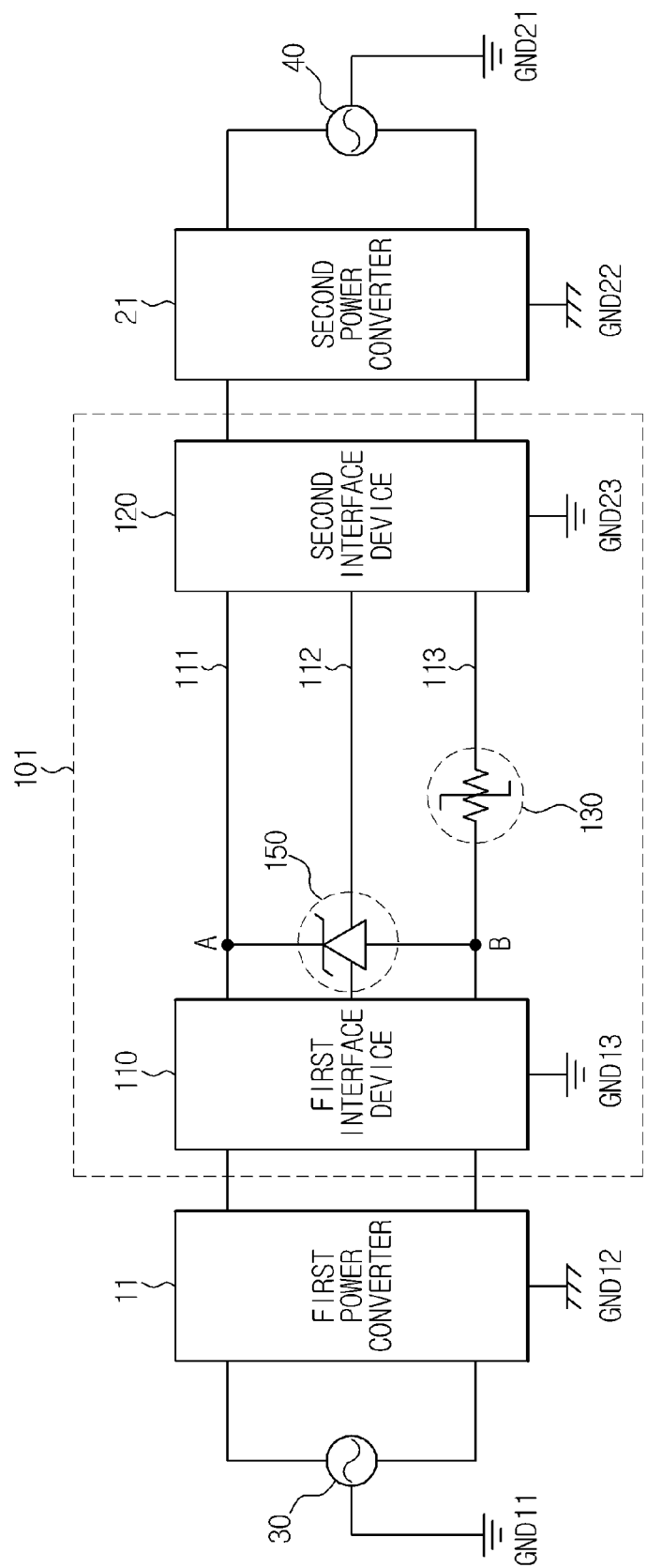
FIG. 8 is a schematic circuit diagram of the interface unit of FIG. 7.

FIG. 7 is a block diagram illustrating a configuration of an interface unit 100 according to another exemplary embodiment of the present general inventive concept, and FIG. 8 is a schematic circuit diagram of the interface unit 100 of FIG. 7.

Referring to FIGS. 7 and 8, the interface unit 101 according to the another exemplary embodiment of the present general inventive concept, further includes an overvoltage protector 150 to protect the interface devices 110 and 120, respectively, from an overvoltage, in addition to the configuration of the interface unit 101 illustrated in FIGS. 1 and 2. The configuration of the interface unit 101 other than the overvoltage protector 150 is the same as that stated previously with reference to FIGS. 1 and 2.

The overvoltage protector 150 protects the interface devices 110 and 120 from a VCC overvoltage generated in the VCC line 111. The overvoltage protector 150 may be implemented with a varistor that has a resistance varying with a voltage applied between both electrodes, a gas tube that induces discharge based on a voltage applied between both electrodes spaced by a short distance, a voltage clamping device that clamps a certain voltage, a silicon-controlled rectifier (SCR) that is suitable to be used with high-speed data, a TransZorb device that is a P-type semiconductor device, etc., but is not limited thereto. In the current embodiment of the present general inventive concept, the overvoltage protector 150 is implemented with a Zener diode that is one type of voltage clamping device.

As illustrated in FIG. 8, the overvoltage protector 150 (a.k.a., the Zener diode 150) has a cathode connected to the VCC line 111 and an anode connected to the ground line 113. The Zener diode 150 is designed such that it operates in a breakdown region of a P-N junction and has a breakdown voltage (Zener voltage) based on a doping level of the P-N junction. When a reverse voltage higher than the breakdown voltage is generated, reverse current flows through the Zener diode 150, and a constant voltage equal to the breakdown voltage is applied to the Zener diode 150. That is, in the current embodiment of the present general inventive concept, current flows from a node A to a node B.

As stated previously, when a voltage difference is generated between the grounds of the first and second electronic products 10 and 20, overcurrent flows, and the ground overcurrent interrupter 130 then breaks the ground line 113 to interrupt the flow of the overcurrent. If the ground line 113 is broken, the ground voltage difference may cause a VCC voltage difference. Even if an overvoltage is generated due to the VCC voltage difference, the overvoltage protector 150 may prevent the interface devices 110 and 120 from being damaged.

An operation of the overvoltage protector 150 will hereinafter be described in detail. When a voltage higher than the breakdown voltage is applied to the VCC line 111 due to generation of a VCC overvoltage, the Zener diode 150 operates to allow current to flow in a reverse direction (a direction from the node A to the node B). In addition, a constant voltage equal to the breakdown voltage is applied to the Zener diode 150. As a result, the overvoltage is prevented from damaging other devices, more particularly the interface devices. The breakdown voltage of the Zener diode 150 may be preset to a proper level during the design of the interface unit 101.

In the current embodiment of the present general inventive concept, any voltage clamping device capable of clamping a certain voltage, other than the Zener diode 150, may be applied to the overvoltage protector 150.

In addition, in order to protect the interface devices from the overvoltage, the overvoltage protector 150 may not only break the ground line 113, but also operate when a voltage higher than a rated voltage is generated in the interface devices due to other causes such as generation of a surge.

Figure 9:
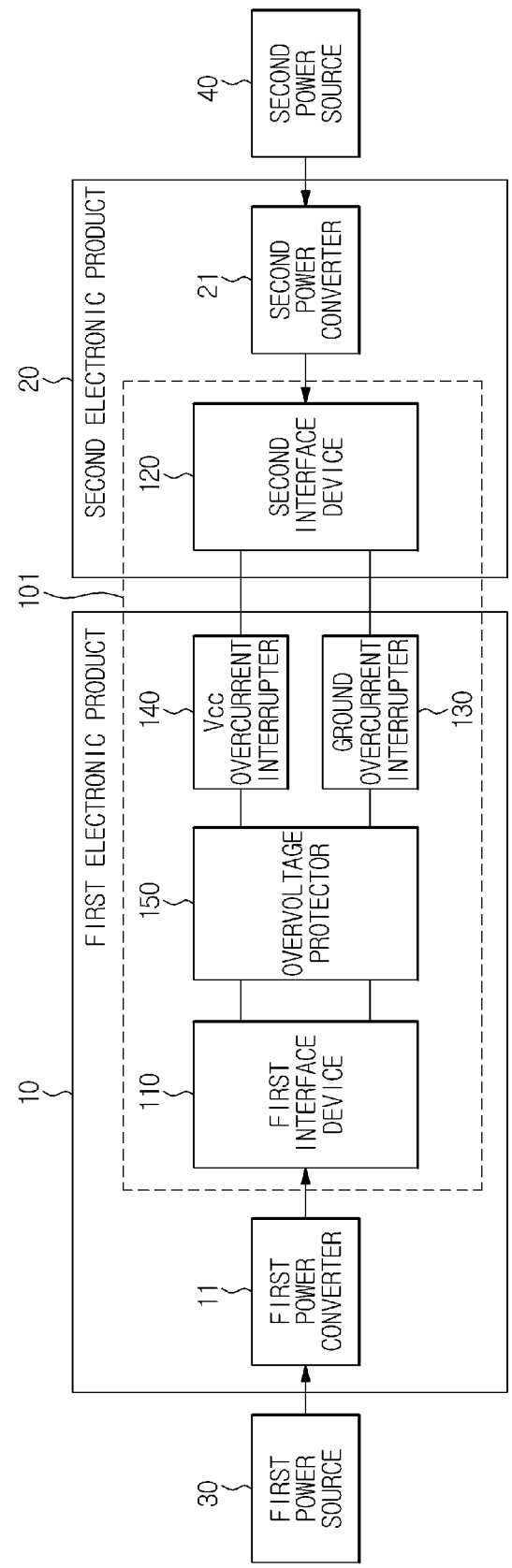
FIG. 9 is a block diagram illustrating a configuration of an interface unit that further includes a VCC overcurrent interrupter installed on a VCC line.
Figure 10:
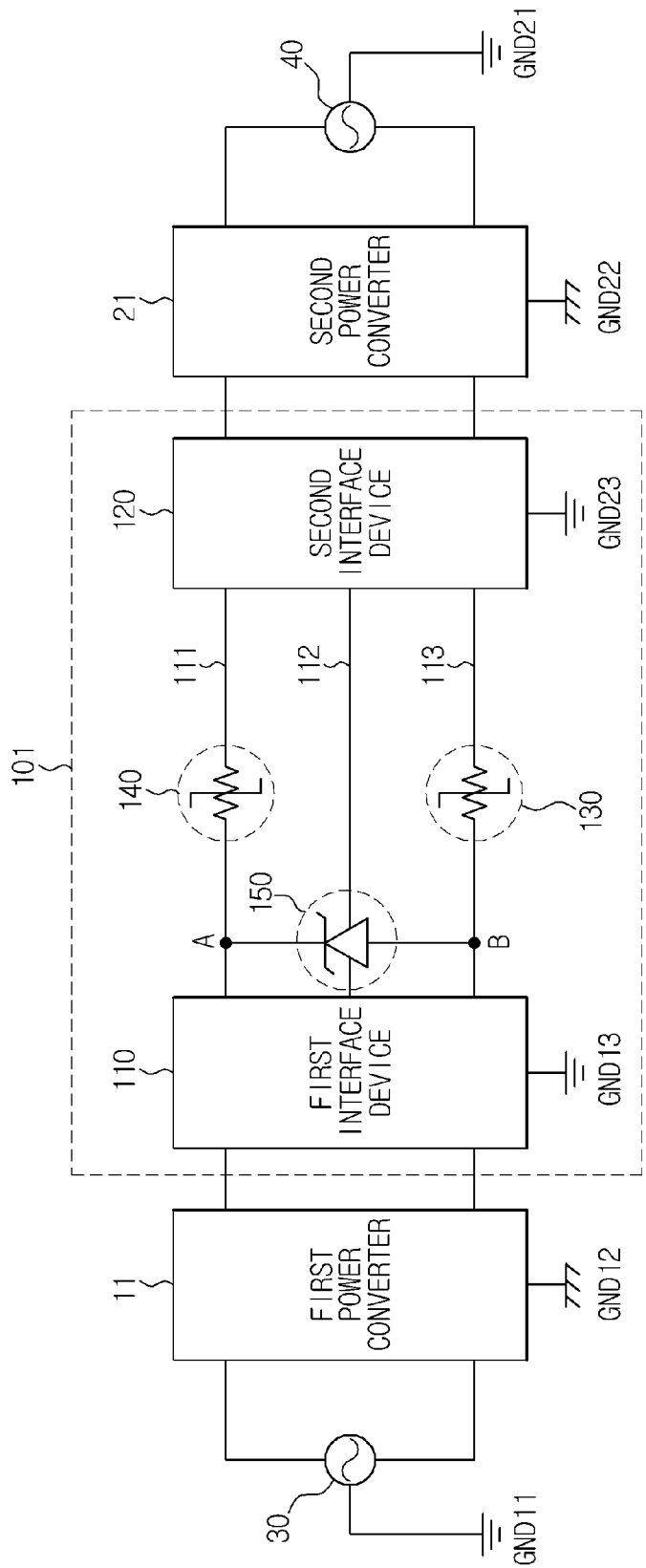
FIG. 10 is a schematic circuit diagram of the interface unit of FIG. 9.

FIG. 9 is a block diagram illustrating configuration of an interface unit 101 that further includes a VCC overcurrent interrupter 140 installed on a VCC line 111, and FIG. 10 is a schematic circuit diagram of the interface unit 101 of FIG. 9. The configuration of the interface unit 101 other than a VCC overcurrent interrupter 140 is the same as that stated previously with reference to FIGS. 7 and 8.

As stated previously, overcurrent may be generated in the VCC line 111 due to various causes such as an error in wiring of the interface devices, and a connection error or short of the data line 112 or VCC line 111. Such overcurrent may damage the interface devices or other components and cause risk of fire. In this regard, the interface unit 101 further includes the VCC overcurrent interrupter 140 that is installed on the VCC line 111 to interrupt overcurrent flowing in the VCC line 111 so as to protect the interface devices from the overcurrent. The VCC overcurrent interrupter 140 may be implemented with a fuse, a polyswitch, or the like. When overcurrent greater than predetermined breaking current flows in the VCC line 111, the VCC overcurrent interrupter 140 interrupts the flow of the overcurrent in the VCC line 111.

According to the interface unit 101 illustrated in FIGS. 9 and 10, it may be possible to protect the interface devices from overcurrent or overvoltage resulting from a ground voltage difference and overcurrent resulting from a short in the products.

Figure 11:
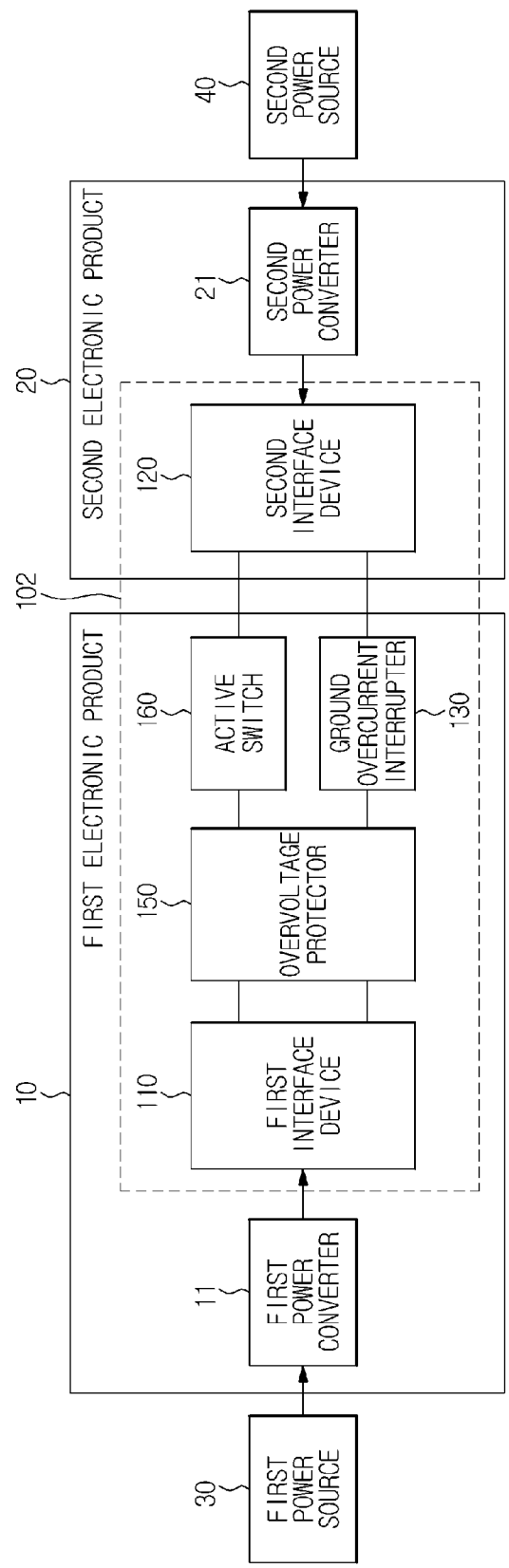
FIG. 11 is a block diagram illustrating a configuration of an interface unit according to a another exemplary embodiment of the present general inventive concept.
Figure 12:
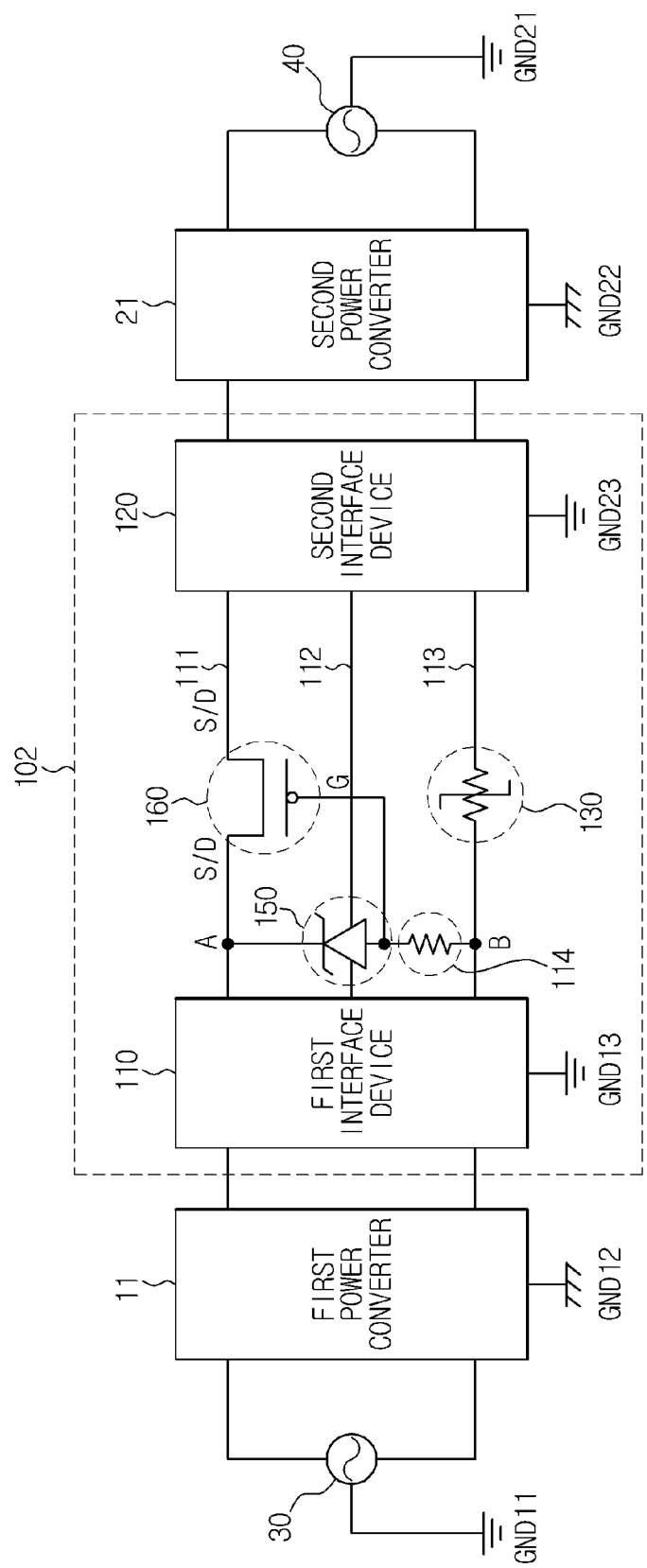
FIG. 12 is a schematic circuit diagram of the interface unit of FIG. 11.

FIG. 11 is a block diagram illustrating a configuration of an interface unit 102 according to another exemplary embodiment of the present general inventive concept, and FIG. 12 is a schematic circuit diagram of the interface unit 102 of FIG. 11.

Referring to FIGS. 11 and 12, the interface unit 102 may further include an active switch 160 installed on a VCC line 111. The configuration of the interface unit other than the active switch 160 is the same as that stated previously with reference to FIGS. 7 and 8.

The active switch 160 may actively turn on/off a power supply circuit and be implemented with a switching device such as a bipolar transistor (TR) or a field effect transistor (FET). In the exemplary embodiment of FIG. 11, the active switch 160 is implemented with a P-channel metal oxide semiconductor FET (MOSFET).

The MOSFET is a device in which current flowing between two terminals (a source and a drain) of the transistor is controlled by an input voltage. In this MOSFET, current flows only through a channel region between the source and the drain.

In the P-channel MOSFET, a channel is formed when a negative gate-source voltage is applied. A maximum gate-source voltage capable of forming the channel is called a threshold voltage. For example, when the threshold voltage of the P-channel MOSFET is −1V and the source voltage thereof is 5V, the channel is formed when a gate voltage of 4V or less is applied, and current then flows through the formed channel (switch on). Conversely, when a gate voltage of more than 4V is applied, the channel is removed and thus no current flows (switch off).

As illustrated in FIG. 12, the MOSFET is installed on the VCC line 111, and has a voltage input terminal, or gate G, connected to the anode of the Zener diode 150. A resistor 114 having a certain resistance is also connected to the anode of the Zener diode 150. The source S and the drain D are interchangeable in position. Depending on conditions of voltages applied to the interface devices 110 and 120, an electrode connected to the first interface device 110 may be the source S or an electrode connected to the second interface device 120 may be the source S.

When a VCC overvoltage is generated due to the above causes, the Zener diode 150 operates to clamp a constant voltage corresponding to the breakdown voltage. The remainder of the generated overvoltage with the exception of the voltage clamped by the Zener diode 150 becomes the gate voltage of the MOSFET. In this regard, adjusting the threshold voltage of the MOSFET to a value as small as possible may make the capacity of the Zener diode 150 small.

The operation of the active switch 160 will also be described in association with the ground overcurrent interrupter 130. When the ground overcurrent interrupter 130 interrupts the flow of current in the ground line 113 due to generation of a ground voltage difference, a VCC voltage difference may be generated. In this case, the Zener diode 150 clamps a voltage corresponding to the breakdown voltage, thereby operating the active switch 160 to interrupt the flow of current in the VCC line 111. As a result, it may be possible to prevent the interface devices 110 and 120 from being damaged due to an overvoltage.

Figure 13:
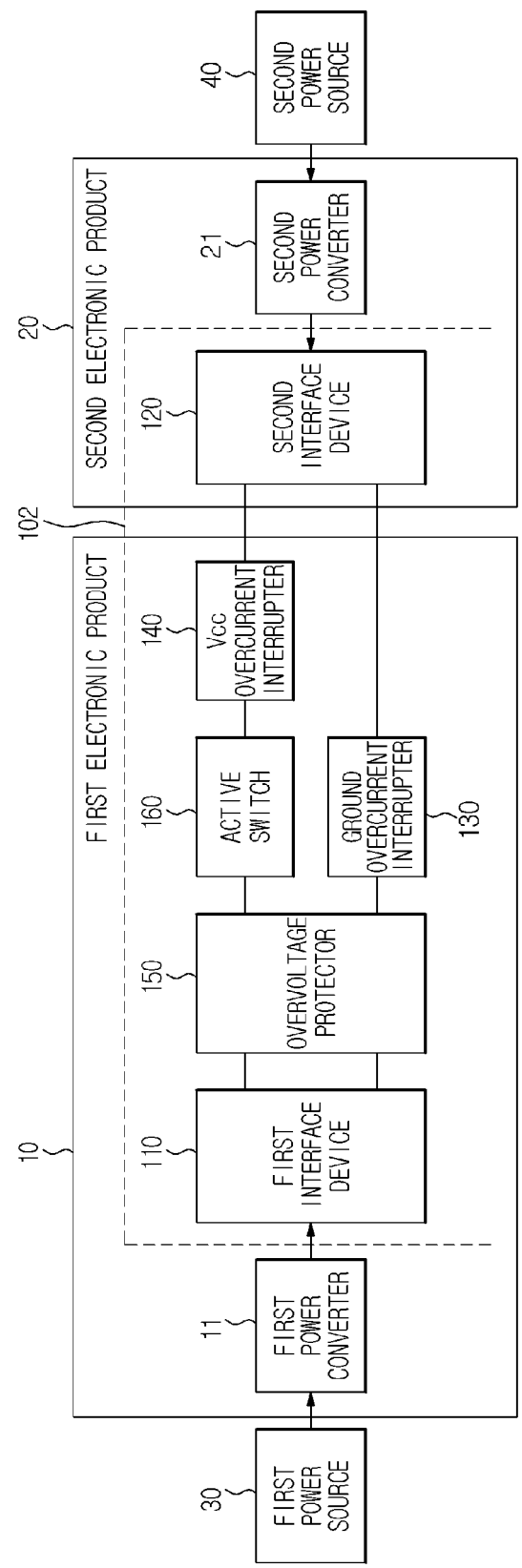
FIG. 13 is a block diagram illustrating a configuration of an interface unit that further includes a VCC overcurrent interrupter.
Figure 14:
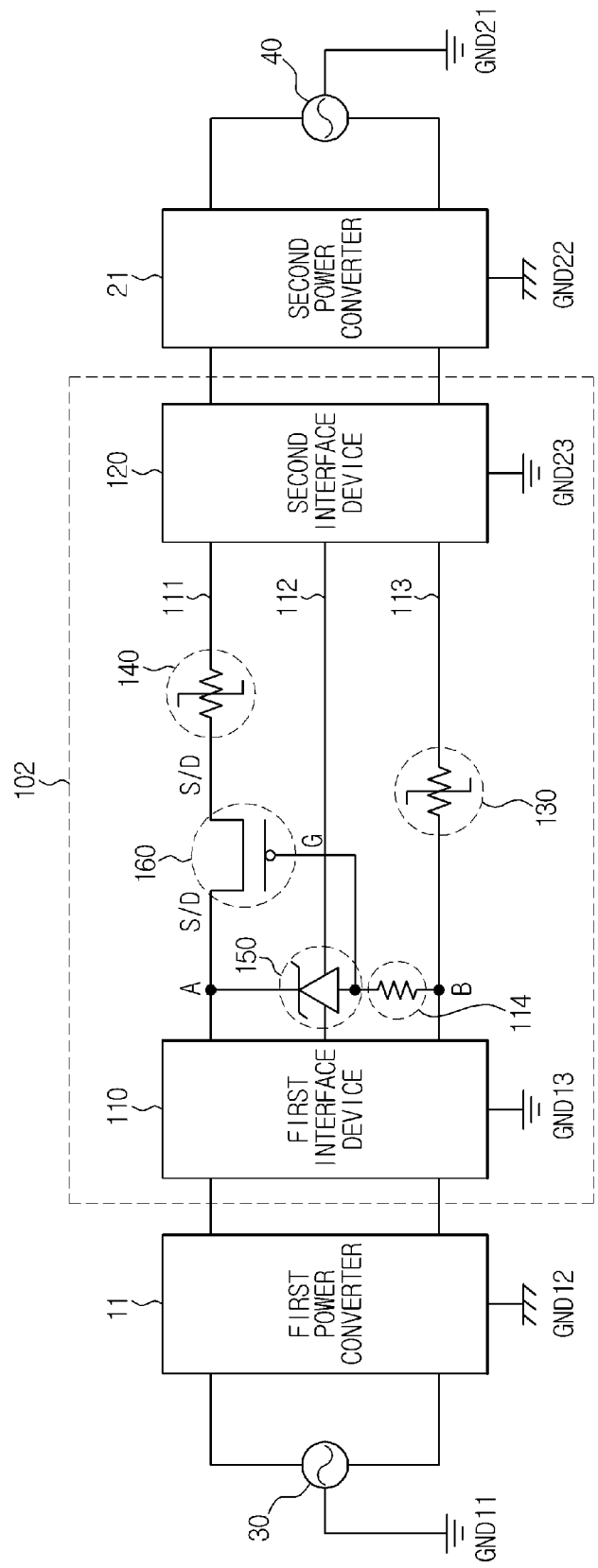
FIG. 14 is a schematic circuit diagram of the interface unit of FIG. 13.

FIG. 13 is a block diagram illustrating a configuration of an interface unit 102 that further includes a VCC overcurrent interrupter, and FIG. 14 is a schematic circuit diagram of the interface unit 102 of FIG. 13.

Referring to FIGS. 13 and 14, the interface unit 102 according to the another exemplary embodiment of the present general inventive concept may further include a VCC overcurrent interrupter 140 installed on the VCC line 111. The VCC overcurrent interrupter 140 has the same configuration as in the above-stated embodiments. In FIG. 14, the VCC overcurrent interrupter 140 is implemented with a polyswitch.

Here, the active switch 160 and the VCC overcurrent interrupter 140 are interchangeable in installation position. When overcurrent greater than the breaking current of the VCC overcurrent interrupter 140 flows in the VCC line 111, the VCC overcurrent interrupter 140 interrupts the flow of the overcurrent even if the active switch 160 does not break the power supply circuit. Alternatively, the active switch 160 may break the power supply circuit even if the VCC overcurrent interrupter 140 does not interrupt the flow of the overcurrent. That is, in the interface unit according to the embodiment of FIGS. 13 and 14, the ground overcurrent interrupter 130, the overvoltage protector 150, the VCC overcurrent interrupter 140 and the active switch 160 may all be applied to still further increase reliability of the overcurrent and overvoltage interrupting function.

Further, the breakdown voltage of the Zener diode 150, the threshold voltage of the active switch and the breaking current of the VCC overcurrent interrupter 140 may be mutually appropriately set, thereby reducing manufacturing costs or securing a most efficient circuit operation.

In addition, the active switch 160 and the VCC overcurrent interrupter 140 may be integrated into one module, thereby making it possible to promote miniaturization of the unit.

Although the interface units 100, 101, and 102 have been described in the exemplary embodiments of FIGS. 1 to 14, respectively, as including the second interface device 120, exemplary embodiments of the present general inventive concept are not limited thereto. For example, in some exemplary embodiments, the interface unit 100 may not include the second interface device 120.

On the other hand, an electronic product system according to an exemplary embodiment of the present invention may include the first electronic product 10, the second electronic product 20 and one of the interface units 100, 101, or 102 described in each of the embodiments of FIGS. 1 to 14, respectively. In this electronic product system, the first electronic product 10 and the second electronic product 20 may be selected respectively from among electronic products including a PC, a notebook computer, a TV, a printer, a multifunction printer, an audio device, and a video device, as stated previously. These electronic products are only examples, and any other electronic products may be the first electronic product 10 and the second electronic product 20 so long as they can be interconnected by the interface unit to exchange data with each other.

Although the respective components of the interface units 100, 101, and 102, namely, the ground overcurrent interrupter 130, the overvoltage protector 150, and the VCC overcurrent interrupter 140 have been described in the above-stated exemplary embodiments as being installed in the first electronic product 10, which is the host product, embodiments of the present general inventive concept are not limited thereto. For example, the above components may not be limited in installation position, and be installed in the second electronic product 20.

As is apparent from the above description, an interface unit according to an aspect of the present general inventive concept may interrupt overcurrent or overvoltage resulting from a ground voltage difference between electronic products, so as to prevent damage to the electronic products and risk of fire.

Although a few embodiments of the present general inventive concept have been shown and described, it would be appreciated by those skilled in the art that changes may be made in these embodiments without departing from the principles and spirit of the invention, the scope of which is defined in the claims and their equivalents.

What is claimed is:

1. An interface unit to connect a first electronic product and a second electronic product to each other, the interface unit comprising:
    a first interface device being connectable with the first electronic product;
    a second interface device being connectable with the second electronic product and connected with the first interface device through a VCC line and a ground line;
    a ground overcurrent interrupter installed on the ground line between grounds of the first interface device and the second interface device, the ground overcurrent interrupter preventing overcurrent resulting from a ground voltage difference between the first interface device and the second interface device by interrupting overcurrent flowing in the ground line; and
    an overvoltage protector installed on the VCC line between VCCs of the first interface device and the second interface device, the overvoltage protector keeping a voltage applied to the VCC line at a predetermined reference level or less.

2. The interface unit according to claim 1, wherein the overvoltage protector is connected between the VCC line and the ground line.

3. The interface unit according to claim 1, wherein the overvoltage protector comprises a voltage clamping device to clamp a voltage of a predetermined level.

4. The interface unit according to claim 3, wherein the voltage clamping device comprises a Zener diode, the Zener diode having a cathode connected to the VCC line and an anode connected to the ground line.

5. The interface unit according to claim 1, further comprising a VCC overcurrent interrupter installed on the VCC line, the VCC overcurrent interrupter interrupting overcurrent flowing in the VCC line.

6. The interface unit according to claim 1, further comprising an active switch installed on the VCC line, the active switch breaking a connection between operating voltage sources through the VCC line when a voltage of more than a predetermined level is input thereto.

7. The interface unit according to claim 6, wherein the active switch has a voltage input terminal connected to an output terminal of the overvoltage protector.

8. The interface unit according to claim 7, further comprising a resistor connected to the output terminal of the overvoltage protector, the resistor having a certain resistance.

9. The interface unit according to claim 8, wherein the active switch interrupts current flowing in the VCC line when the voltage of more than the predetermined level is input thereto through the voltage input terminal thereof.

10. The interface unit according to claim 9, wherein the active switch comprises at least one of a bipolar transistor and a field effect transistor (FET).

11. The interface unit according to claim 5, wherein each of the ground overcurrent interrupter and VCC overcurrent interrupter comprises at least one of a fuse and a polyswitch.

12. An image forming apparatus connected to a host device, the image forming apparatus comprising:
    an interface, wherein the interface comprises:
        a VCC line;
        a ground line;
        a ground overcurrent interrupter installed on the ground line between grounds of a first interface device connectable with the image forming apparatus and a second interface device connectable with the host device, the ground overcurrent interrupter preventing overcurrent resulting from a ground voltage difference between the first interface device connectable with the image forming apparatus and the second interface device connectable with the host device by interrupting overcurrent flowing in the ground line; and
        an overvoltage protector installed on the VCC line between VCCs of the first interface device and the second interface device, the overvoltage protector keeping a voltage applied to the VCC line at a predetermined reference level or less.

13. The image forming apparatus according to claim 12, wherein the overvoltage protector is connected between the VCC line and the ground line.

14. The image forming apparatus according to claim 12, wherein the overvoltage protector comprises a voltage clamping device to clamp a voltage of a predetermined level.

15. The image forming apparatus according to claim 14, wherein the voltage clamping device comprises a Zener diode, the Zener diode having a cathode connected to the VCC line and an anode connected to the ground line.

16. The image forming apparatus according to claim 12, wherein the interface unit further comprises a VCC overcurrent interrupter installed on the VCC line, the VCC overcurrent interrupter interrupting overcurrent flowing in the VCC line.

17. The image forming apparatus according to claim 12, wherein the interface unit further comprises an active switch installed on the VCC line, the active switch breaking a connection between operating voltage sources through the VCC line when a voltage of more than a predetermined level is input thereto.

18. The image forming apparatus according to claim 17, wherein the active switch has a voltage input terminal connected to an output terminal of the overvoltage protector.

19. The image forming apparatus according to claim 18, wherein the interface unit further comprises a resistor connected to the output terminal of the overvoltage protector, the resistor having a certain resistance.

20. The image forming apparatus according to claim 19, wherein the active switch interrupts current flowing in the VCC line when the voltage of more than the predetermined level is input thereto through the voltage input terminal thereof.

21. The image forming apparatus according to claim 20, wherein the active switch comprises at least one of a bipolar transistor and a field effect transistor (FET).

22. The image forming apparatus according to claim 16, wherein each of the ground overcurrent interrupter and VCC overcurrent interrupter comprises at least one of a fuse and a polyswitch.

23. An interface unit, comprising:
a ground line to connect grounds of a first electronic product to a ground of a second electronic product;
a VCC line to connect a VCC of the first electronic product to a VCC of the second electronic product;
a data line;
a first interface device being connectable to the first electronic product;
a second interface device being connectable to the second electronic product and connected with the first interface device through the VCC line, the data line, and the ground line;
a ground overcurrent interrupter installed on the ground line between grounds of the first interface device and the second interface device, and to prevent overcurrent resulting from a ground voltage difference between the first interface device and the second interface device by interrupting overcurrent flowing in the ground line; and
an overvoltage protector including one end installed on the VCC line and another end installed on the ground line to keep a voltage applied to the VCC line at a predetermined reference level or less.

24. The interface unit of claim 23, wherein the overvoltage protector is installed between the first interface device and the second interface device.

25. The interface unit of claim 23, further comprising:
a VCC overcurrent interrupter installed on the VCC line to interrupt overcurrent flowing in the VCC line.

26. The interface unit of claim 25, wherein the VCC overcurrent interrupter is installed between the overvoltage protector and the second interface device.

27. The interface unit of claim 23, further comprising:
an active switch installed on the VCC line to break a connection between operating voltage sources through the VCC line in response to a voltage of more than a predetermined level being input thereto.

28. The interface unit of claim 27, wherein the active switch is installed between the overvoltage protector and the second interface device.

* * * * *